United States Patent [19]
Norbury

[11] Patent Number: 5,632,907
[45] Date of Patent: May 27, 1997

[54] TRAVELING BACKWASH MANIFOLD FOR A CENTRIFUGE

[76] Inventor: Fritz Norbury, Rte. 4, Box 429-A, Carthage, Mo. 64836

[21] Appl. No.: 578,765

[22] Filed: Dec. 26, 1995

[51] Int. Cl.$^6$ .................. B01D 21/26; B01D 29/68
[52] U.S. Cl. .......... 210/787; 210/791; 210/360.1; 210/380.1; 210/391; 210/393; 210/411; 100/117
[58] Field of Search .................. 210/767, 772, 210/780, 781, 787, 791, 360.1, 380.1, 391, 393, 411; 100/117

[56] References Cited

U.S. PATENT DOCUMENTS

| | | | |
|---|---|---|---|
| 5,069,922 | 12/1991 | Brotsky et al. | 426/332 |
| 5,143,739 | 9/1992 | Bender et al. | 426/332 |
| 5,283,073 | 2/1994 | Bender et al. | 426/332 |
| 5,386,765 | 2/1995 | Olusczak et al. | 210/411 |

FOREIGN PATENT DOCUMENTS 0584955  3/1994  European Pat. Off. .

*Primary Examiner*—David A. Reifsnyder
*Attorney, Agent, or Firm*—Craig M. Bell

[57] ABSTRACT

A method and apparatus for filtering a liquid from a liquid/solid mixture using a centrifuge. The centrifuge has a conveyor having a hub and a flight for imparting a centrifugal motion to the liquid/solid mixture. The conveyor is rotated for imparting the centrifugal motion. A filter is carried in the tank which holds the conveyor. The filter encircles the conveyor for filtering the liquid from the liquid/solid mixture. A backwash system has a tube having a series of nozzles positioned for spraying a fluid at the filter in a narrow band which circumscribes the filter. The tubing is connected to a header which projects out of the casing through an opening. The fluid sprayed through the nozzles is pumped through the header to the tubing having the nozzles. A cylinder is connected to the header for moving the header and the connected tubing longitudinally such that the nozzles move longitudinally along the filter for spraying the liquid against the filter in a narrow band distinct from a first narrow band by the relative movement of the nozzles to the filter. The fluid from the backwash system is at a force to counteract the centrifugal force of the mixture over the narrow band of the filter engaged by the spray. The fluid used for the backwash is the filtered liquid.

14 Claims, 6 Drawing Sheets

TRAVELING BACKWASH MANIFOLD FOR A CENTRIFUGE

FIELD OF THE INVENTION

This invention is related to a centrifuge for filtering a liquid from a liquid/solid mixture, and more particularly, is related to a backwash system for cleaning the filter of the centrifuge.

BACKGROUND OF THE INVENTION

In the processing of poultry for human consumption there is a concern about the levels of salmonella bacteria on the poultry. Therefore, methods and apparatus which reduce the levels of salmonella bacteria are desired. However, the poultry producing industry is very competitive, and therefore, the apparatus and methods must be cost effective.

There are several steps which occur after slaughtering the poultry prior to packing and shipping. Poultry is processed, after slaughtering, by scalding to assist in defeathering, defeathering by machine, washing, eviscerating, and chilling prior to packing. One of the concerns in these treatments is to avoid causing a change in the appearance characteristics of poultry which would make the poultry unsalable.

While a large part of the carcass contamination with salmonella can be removed by water washing, there is still a concern with colonies of bacteria left behind which can cross-contaminate surfaces which are not heated sufficiently to cause thermal destruction of the bacteria.

It has been recognized that Whatever treatment system is used, it must be economical, easy to use, compatiblity with food manufacturing, and must not change the organoleptic properties of the poultry. One such method recognized for reducing salmonella is to treat the carcass with an eight (8) percent solution of trisodium phosphate having a pH of about 11.8, preferably during the inside/outside wash after evisceration. U.S. Pat. No. 5,283,073 discloses such a process and is incorporated herein by reference.

When a pure water wash was used, typically the water and the debris, such as pin feathers and fat globules, were sent down the sewer drain without an attempt to recycle the water. However, with the use of solutions such as trisodium phosphate and the increasing cost associated with water and the disposal of the waste, it has been desirable to filter the solution/debris mixture (herein referred to as the "mixture") in order to recycle the solution.

An existing method of filtering the mixture is to use a filter system which places the mixture in a centrifuge separator having a conveyor. The conveyor has a hub and one or more flights for rotating the mixture and imparting a centrifugal force on the mixture. A mesh screen filter encircles the conveyor, through which the solution passes and is filtered. The debris is moved by the flight of the conveyor to one end where the debris is removed and disposed. A centrifuge of this type is sold by Russell Finex.

In order to remove the feathers and fat globules and other debris which adheres to the filter and is not removed by the movement of the conveyor, the separator has a series of four pipes running laterally next to and outside of the filter. The filter is, therefore, interposed between the conveyor and the pipes. The pipes each have a series of nozzles for spraying a solution at the filter. In a known embodiment there are four nozzles per pipe. With the conveyor continuing to rotate but with the mixture not being pumped into the conveyor, the spray hits the exterior of the filter in order to force feathers and fat globules stuck to the interior of the filter away from the pores of the filter. The debris is moved by the conveyor. This is generally described as backwashing the filter. The system must be shut down in order to do the backwash, since the pressure of the mixture against the filter created by the centrifuge would not allow the spray from the exterior to remove debris from the filter.

Even with the system shut down, the backwash system described does not do a thorough job of cleaning the filter. The sixteen (16) nozzles do not effectively reach all areas of the filter. Even with the sixteen nozzles, a cone spray pattern was required to attempt to cover the majority of the filter screen surface. A cone pattern nozzle is limited as to the impact energy that the spray can deliver to a given target. Even at elevated pressures, the tendency of the cone spray pattern is to atomize the spray rather than increase impact energy. One of the major difficulties that results from the ineffective cleaning is that the filter gets clogged and the system must wastefully be shut done every 30 minutes to 2 hours and centrifuge pulled apart for a more thorough cleaning. This results in a system in which cost effectiveness is minimal, even with the improved reduction of salmonella contamination and potentially longer shelf life of the poultry which results from use of the trisodium phosphate solution.

It is desired to have a system, a backwash system, for sending a flow of fluid at the filter in the direction opposite the normal flow to remove the solids (i.e., debris) from the filter such that the centrifuge does not need to be torn apart specifically to de-clog the filter. In addition, it is desired that such a backwash system allow filtering to continue to occur while backwashing.

SUMMARY OF THE INVENTION

This invention relates to a method and an apparatus for filtering a liquid from a liquid/solid mixture using a centrifuge. The centrifuge has a conveyor having a hub and a flight for imparting a centrifugal motion to the liquid/solid mixture. The conveyor is rotated for imparting the centrifugal motion to the mixture. A filter is carried in the tank which holds the conveyor. The filter encircles the conveyor for filtering the liquid from the liquid/solid mixture. A backwash system has a tube having a series of nozzles positioned for spraying a fluid at the filter in a first narrow band which circumscribes the filter. The tubing is connected to a header which projects out of the casing through an opening. The fluid sprayed through the nozzles is pumped through the header to the tubing having the nozzles. A cylinder is connected to the header for moving the header and the connected tubing longitudinally such that the nozzles move longitudinally along the filter for spraying the liquid against the filter in a narrow band distinct from the first narrow band by the relative movement of the nozzles to the filter.

In a preferred method of operation, the conveyor continues to rotate and the centrifugal force forces the liquid through the filter. The fluid from the backwash system is delivered to the filter at a force to counteract the centrifugal force of the mixture over the narrow band of the filter engaged by the spray.

In a preferred embodiment, the fluid used for the backwash is the filtered liquid. Therefore, the backwashing of the filter does not dilute or adversely effect the recycled fluid.

One object, feature, and advantage resides in the ability of the filtering to continue to occur in portions not being backwashed at the same time as the backwash is occurring.

Further objects, features, and advantages of the present invention will become more apparent to those skilled in the art upon reading and comprehending the embodiment described below and illustrated in the accompanying drawings.

BRIEF DESCRIPTION OF THE DRAWINGS

For the purpose of illustrating the invention, the drawings show a form which is presently preferred. However, this invention is not intended to be limited, nor is it limited, to the precise arrangement and instrumentalities shown. The scope of the invention is determined by the claims found at the end of this description.

DETAILED DESCRIPTION OF THE INVENTION

Figure 1:
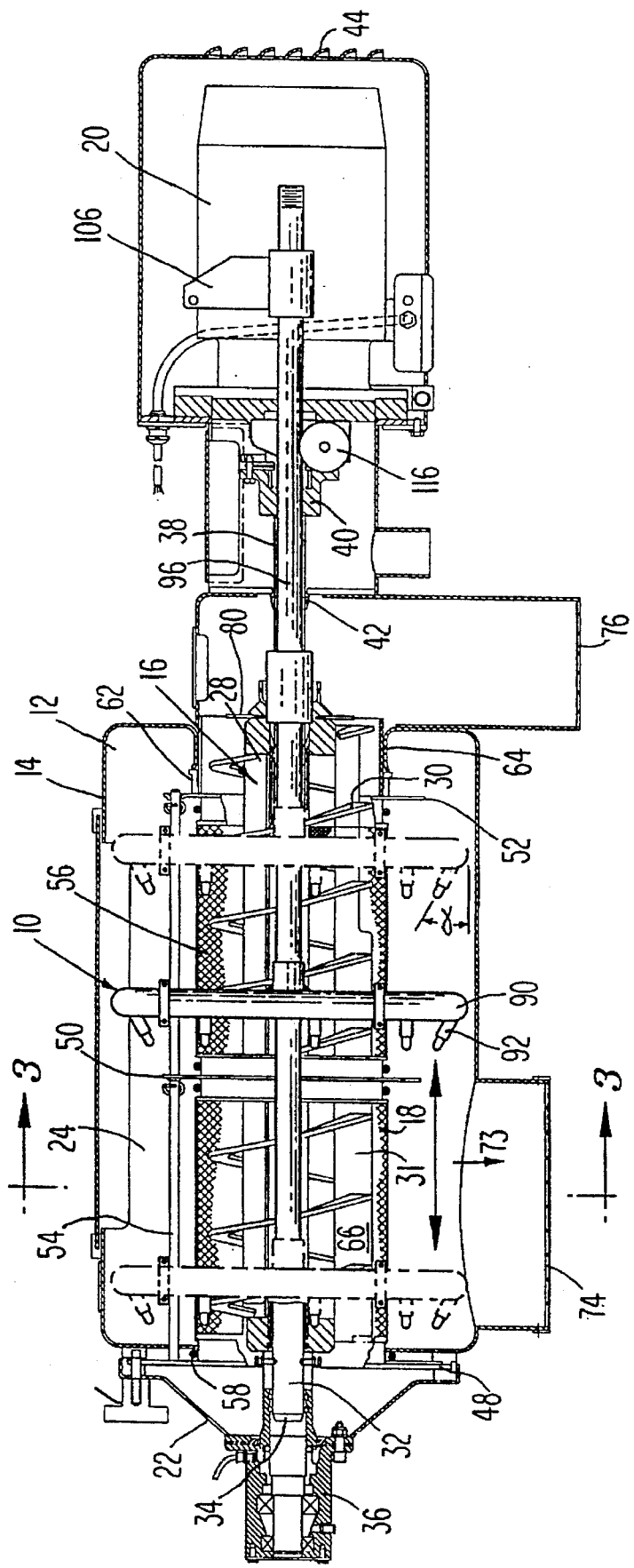
FIG. 1 is a cross-sectional view of a centrifuge according to the invention.

When referring to the drawings in the description which follows, like numerals indicate like elements, and primes ('and") indicate counterparts of such elements. FIG. 1 shows a backwash apparatus 10 in a centrifuge 12 according to the invention.

Referring to FIG. 1, the centrifuge 12 has a casing 14, a conveyor 16, a mesh filter 18, and a motor 20 in addition to the backwash apparatus 10. The casing 14 with an end cover 22 defines a bowl or tank 24.

The conveyer 16 is located in the tank 24 of the centrifuge 12. The conveyor 16 has a center hub 28 and a helical flight 30 around the center hub 28. The conveyor 16 also has a paddle 31 carried by the flight 30 and spaced from the hub 28. Extending through and outward from each end of the center hub 28 of the conveyor 16 is a shaft 32. One of ends 34 of the shaft 32, an end cover end, is received by a bearing assembly 36 in the end cover 22 to allow rotation of the conveyor 16. The other end 38 of the shaft 32, a drive end, is connected to the motor 20 by a flexible drive couple 40. A shaft lip seal 42 is interposed between the conveyor 16 and the motor 20 on the shaft 32 to seal the tank 24. (The other end 38 of the shaft 32 and the shaft lip 42 are partially hidden in the Figures). The motor 20 rotates the conveyor 16 within the tank 24 about the longitudinal axis 44 of the conveyor 16.

Figure 2:
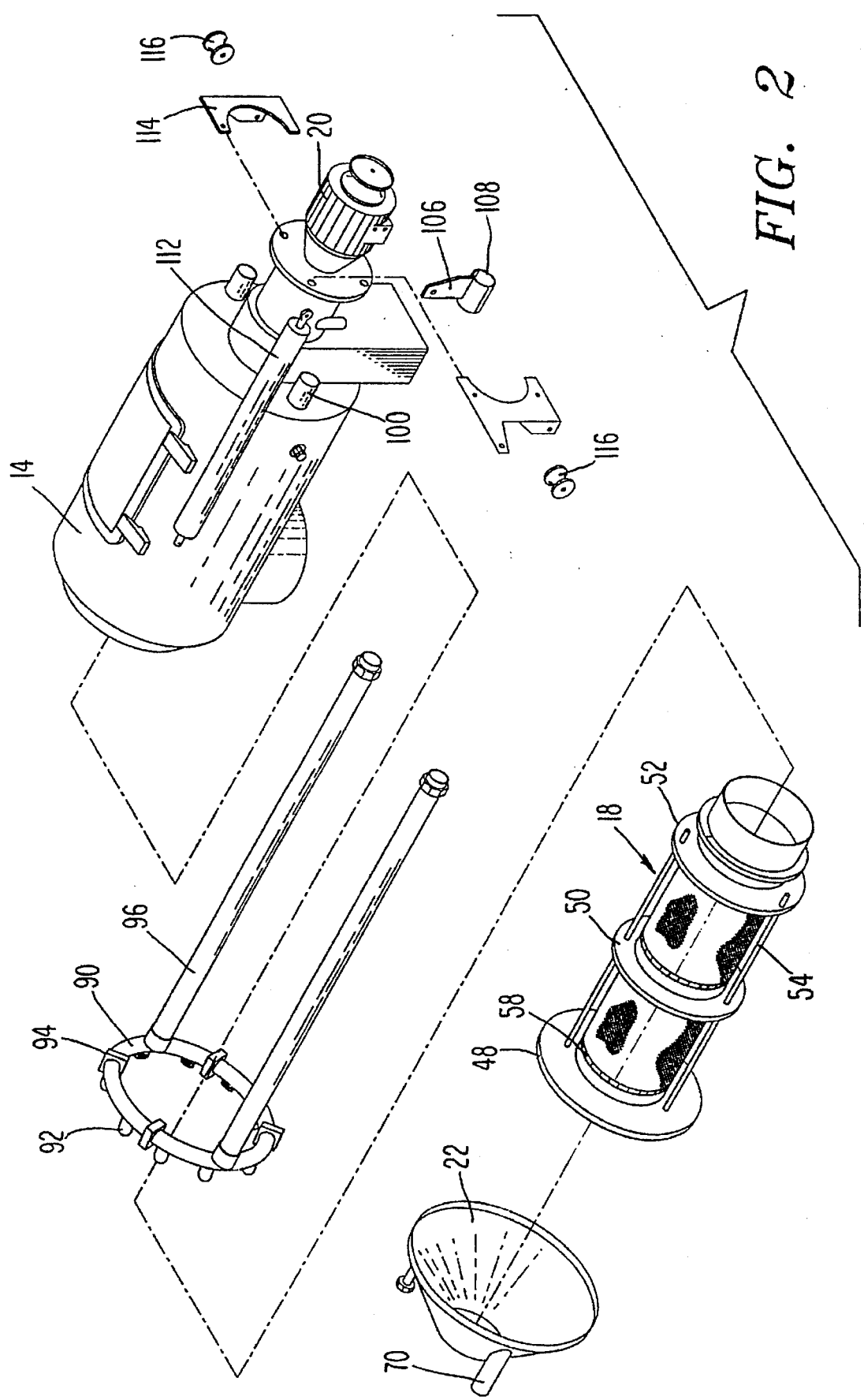
FIG. 2 is an exploded perspective view of the centrifuge.
Figure 3:
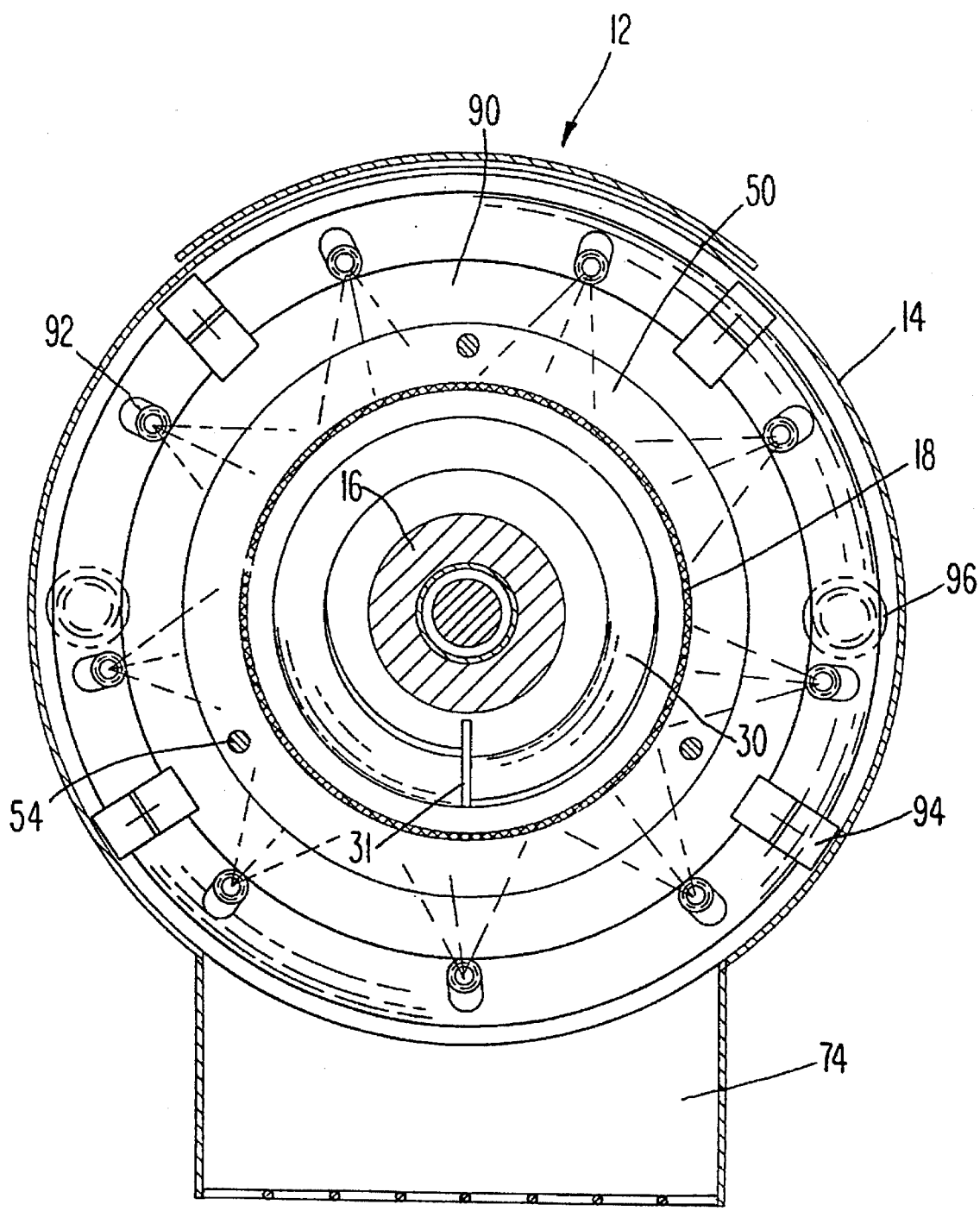
FIG. 3 is a cross-sectional view taken along line 3—3 of FIG. 1.

The mesh filter 18 encircles the conveyor 16. As best seen in FIG. 2, the mesh filter 18 has a triplet of flanges 48, 50, and 52 and a plurality of support rods 54. The support rods 54 extend between the end flanges 48 and 52 and through the center flange 50 for spacing the flanges 48, 50, and 52. The flanges are annular in shape such that the conveyor 16 extends through the flanges, as best seen in FIG. 4.

The mesh filter 18 has a pair of mesh sleeves 56. One of the mesh sleeves 56 extends between the front mesh flange 48 and the center mesh flange 50. The mesh sleeve 56 is secured to the flanges 48 and 50 by a pair of mesh clips 58. The other mesh sleeve 56 is extended between the center mesh flange 50 and the rear mesh flange 52 and is similarly secured using the mesh clips 58.

The rear mesh flange 52 is placed in sealing engagement with a mesh/frame gasket 62 mounted to an annular wall 64 of the casing 14. The front mesh flange 48 is placed in sealing engagement between the casing 14 and the end cover 22. The mesh sleeve 56 of the mesh filter 18 defines an interior unfiltered portion 66 which receives an unfiltered mixture, as represented by an arrow 72 in FIG. 4, and an exterior filtered portion 68 for accepting a filtered solution, as represented by an arrow 73, which passes through the mesh sleeve 56.

Figure 4:
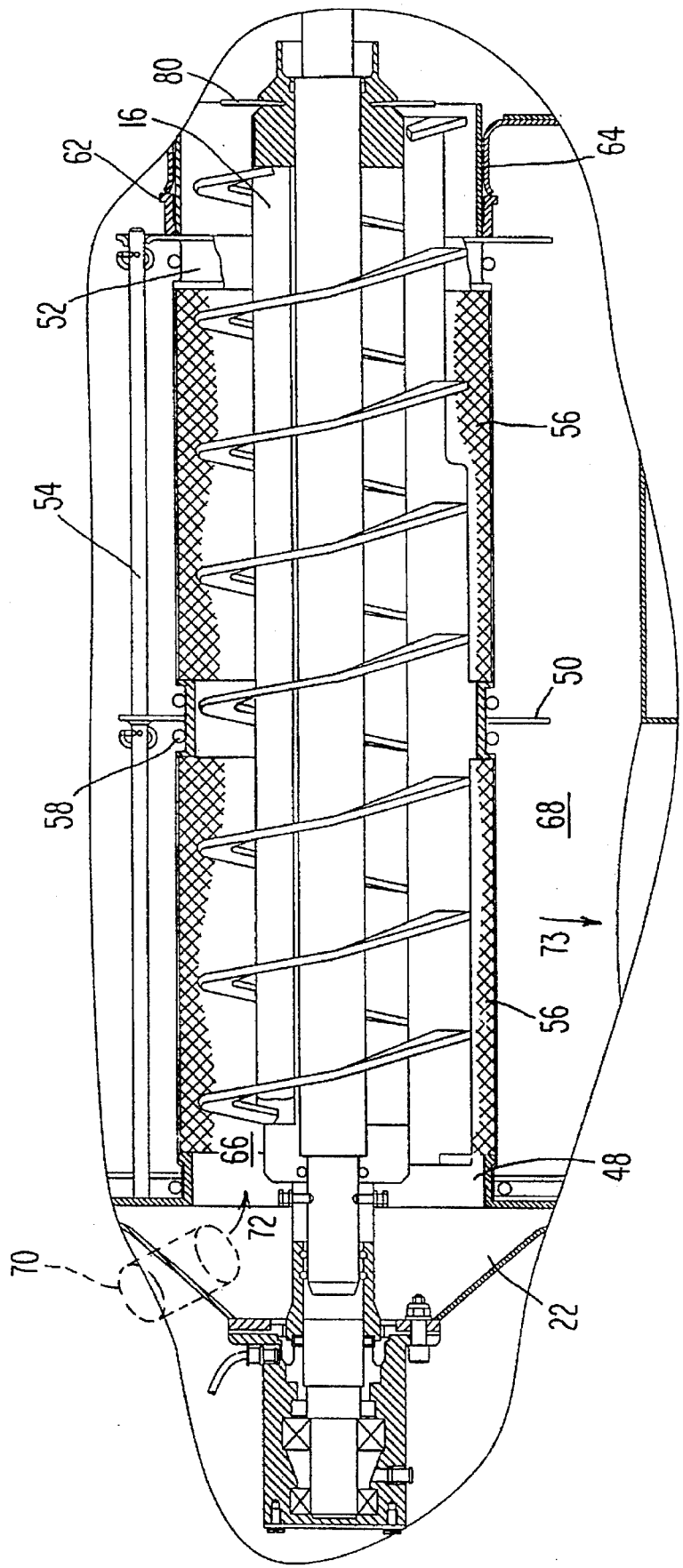
FIG. 4 is an enlarged view of a portion of the centrifugal separator.

Referring to FIG. 4, the end cover 22 has an inlet 70, shown in phantom, for receiving the unfiltered mixture 72. If the unfiltered mixture 72 came from a poultry processing line, where a solution of trisodium phosphate was sprayed on the poultry, the mixture could consist of pin feathers, fat globules, necks, broken parts, and other items within the trisodium phosphate solution. The centrifuge 12 has two discharge ports, a liquid discharge port 74 and a solids discharge port 76, as seen in FIG. 1. Referring to FIG. 4, at the solids discharge end of the conveyor 16 the hub 28 has a diaphragm or dam 80 projecting towards the annular wall 64 for maintaining the unfiltered mixture 72 in the conveyor 16.

In operation, the mixture 72 is pumped into the inlet 70 and is entrained by the conveyor 16. The mixture 72 is forced against the mesh sleeve 56 with the liquid (filtered solution) 73 passing through the pores of the filter. The filtered solution 73 which passes through the pores of the mesh sleeve 56 drains to the liquid discharge port 74.

In a preferred embodiment, the mesh sleeves 56 are made of nylon or other USDA approved material. The screen size of the filter varies dependent on the type of processing in which the conveyor is to be used.

The flights 30 of the conveyor 16 move the remaining mixture 72 along the conveyor 16, to the right as seen in FIGS. 1 and 4, until the mixture 72 reaches other end, the solids discharge end, of the conveyor 16. The flights 30 of the conveyor do not engage the mesh sleeves 56 of the mesh filter 18. Therefore, the solids of the mixture are in part moved towards the solids discharge port 76 by the helical flow imparted to the fluids. That portion of the mixture which remains within the interior unfiltered portion 66 is pushed by the flights 30 past the diaphragm 80 and drops into the solid discharge port 76. This mixture has a higher concentration of solids than was placed in the inlet 70, in that a large portion of the solution liquid has been filtered off. The conveyor 16 as described above is conventional.

In a preferred embodiment, the backwash apparatus 10 described in detail below was used in a centrifuge 12 having a conveyor 16 approximately 26 inches in length and having a hub diameter of one and one-half (1½) inches. The outside edge of the paddle 31 is 3.8 inches from the center longitudinal axis 44 of the centrifuge 12. The mesh filter 18 has a diameter of eight (8) inches and each mesh sleeve 56 spans a gap between flanges 48, 50, and 52 of six and three quarters (6¾) inches. The casing 14, end cover 22, and conveyor 16 are made of stainless steel or other material approved by the USDA. While in a preferred embodiment, the conveyor 16 is capable of variable revolutions per minute (RPM), the conveyor 16 typically operates at 900 RPM revolutions per minute.

The Backwash Apparatus

Referring to FIG. 1, the backwash apparatus 10 of this invention in a preferred embodiment has a circular manifold or pipe 90. The circular manifold 90 has a toroidal shape and is located between the casing 14 and the mesh sleeves 56 in the exterior filter portion 68. A plurality of nozzles 92 project from the circular manifold 90 at an angle α relative to a line parallel to the longitudinal axis 44. In a preferred embodiment, there are nine nozzles 92 positioned 40 degrees apart and at an angle α of 15 degrees relative to a line parallel to the longitudinal axis 44 of the conveyor 16. A plurality of sliders 94 are mounted to the manifold 90 for sliding engagement with the casing 14.

The number of nozzles is determined by the angle of the spray pattern and width of the spray pattern when the liquid impacts on the mesh filter 56. While the number of nozzles is not dependent on the number of support rods, the nozzles were positioned to avoid being located directly in line with the support rods. The angle of the nozzles 92 was determined by the spacing available between the casing 14 and the filter flanges 48, 50, and 52. If the nozzles were at a greater angle, the nozzles 92 would hit the filter flanges 48, 50, and 52. Furthermore, a greater angle would bring the nozzles 92 closer to the mesh filter 56, thus reducing the width of the spray pattern and requiring more than nine (9) nozzles 92 to cover the circumference of the filter screen.

The nozzles 92 are angled away from the solids discharge port 76. With the nozzles 92 angled away from the solids discharge port 76 the backwash spray is prevented from escaping through the solids discharge port 76 when the manifold is in proximity to the filter flange 52; the backwash stroke is completed.

The backwash apparatus 10 has a pair of headers 96 as best seen in FIG. 2. Each of the headers 96 is mounted at one end of and equally spaced around the manifold 90. Each of the headers 96 extends in the longitudinal direction of the conveyer 16. The end of the headers 96 opposite the manifold 96, a second end 98, project out of the casing 14 through a cylindrical opening 100.

The second end 98, the end not secured to the manifold, of at least one of the headers is secured to piping, not shown. A backwash fluid flows through the piping into the header 96 and from there into the manifold 90. The backwash fluid is discharged through the nozzle 92 in a narrow band that encircles the mesh sleeve 56. In a preferred embodiment, the backwash fluid is the filtered trisodium phosphate solution.

Referring to FIG. 2, the second end 98 of at least one of the headers 96 is secured to a cylinder attachment arm 106 using a split clamp 108. The cylinder attachment arm 106 is secured to one end of an air cylinder 112 or other drive means. In addition, a pair of brackets 114 are mounted to the exterior of the casing and each has carrier wheels 116 for guiding the movement of the headers.

In operation

As the centrifuge 12 is operating, the backwash apparatus 10 which is connected by the piping to a pump, not shown, which supplies the high pressure liquid to the manifold. The nozzles 92 on the manifold 90 deliver a narrow curtain or band of concentrated, high impact spray at the mesh sleeve 56 in a pattern which completely circumscribes the mesh sleeve 56. The impact of the spray is sufficient to counteract the centrifugal force of the mixture against the mesh sleeve 56 and force the backwash fluid through the mesh sleeve 56 in this narrow portion. Therefore, this backwash liquid removes solids which have adhered to the mesh sleeves 56 and block the pores in this section.

In that only a band of the filter is being backwashed at a time, the remaining portions of the mesh sleeve 56 continue to filter the mixture, since there is not a backwash fluid counteracting the centrifugal force.

The manifold 90 with the nozzles 92 is moved parallel to the longitudinal axis 44 of the conveyor 16. As the manifold 90 moves, a new band of the mesh sleeve 56 is backwashed. That portion of the mesh sleeve 56 just backwashed is no longer subject to the force of the backwash liquid and therefore the centrifugal force is able to force the liquid of the mixture through the mesh sleeve 56. The manifold is moved by the air cylinder 112 via the header 96 and the attachment arm 106. The header 96 rides along the carrier wheel 116 which maintains the header 96 in alignment through the cylindrical opening 100. The sliders 94 are mounted to the manifold 90 to guide the movement of the manifold 90 in the casing 14; the sliders 94 are in constant contact with the inside of the casing 14.

In a preferred embodiment, 35 gallons of backwashing liquid per minute is pumped at the mesh filter 18. The liquid leaves the nozzles at 35 pounds per square inch (psi) in a spray pattern at the screen of 0.25 inches×2.75 inches. This is in contrast to the prior art which pumped 65 gallons per minute attempting to cover the entire mesh filter 18 and having a nozzle pressure of approximately 85 pounds per square inch. Therefore the backwash apparatus 10 does not use as much liquid per minute and does a more thorough job of cleaning the mesh filter 18. If the system pumps are sized properly, the amount of backwash liquid does not directly influence the amount of solution applied to the product. However, the decrease in liquid per minute used to backwash would ideally decrease the energy consumption of the system.

The air cylinder 112 moves the manifold 90 at a rate of 110 inches per minute as the nozzles 92 spray the mesh filter 18 in a preferred embodiment. Therefore, in this preferred embodiment, the entire mesh filter is cleaned in approximately 12 seconds. The cleaning of the mesh filter 18 occurs as the manifold moves left to right as seen in FIGS. 1 and 4. The manifold is returned to the starting position without the nozzles 92 spraying at the mesh filter 18.

Alternative embodiment

Figure 5:
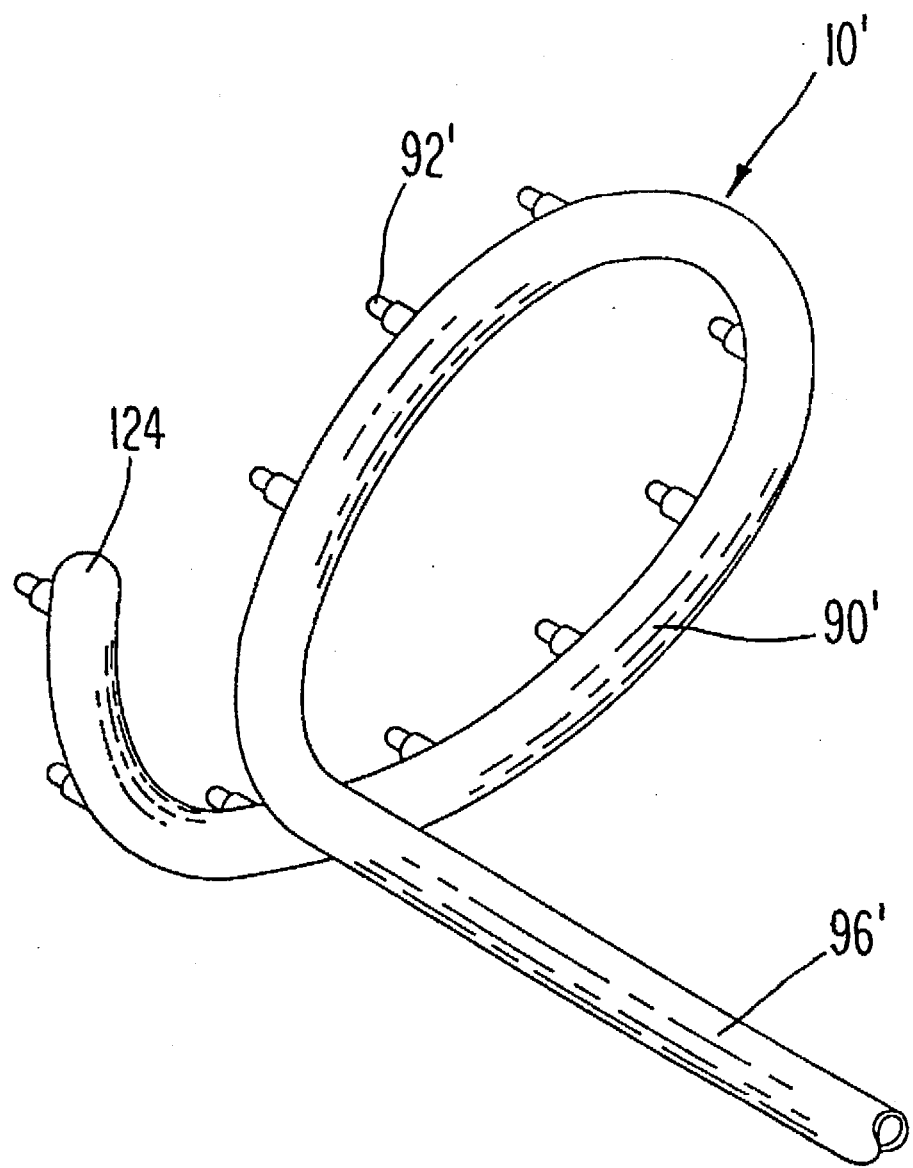
FIG. 5 is a perspective view of an alternative backwash apparatus.
Figure 6:
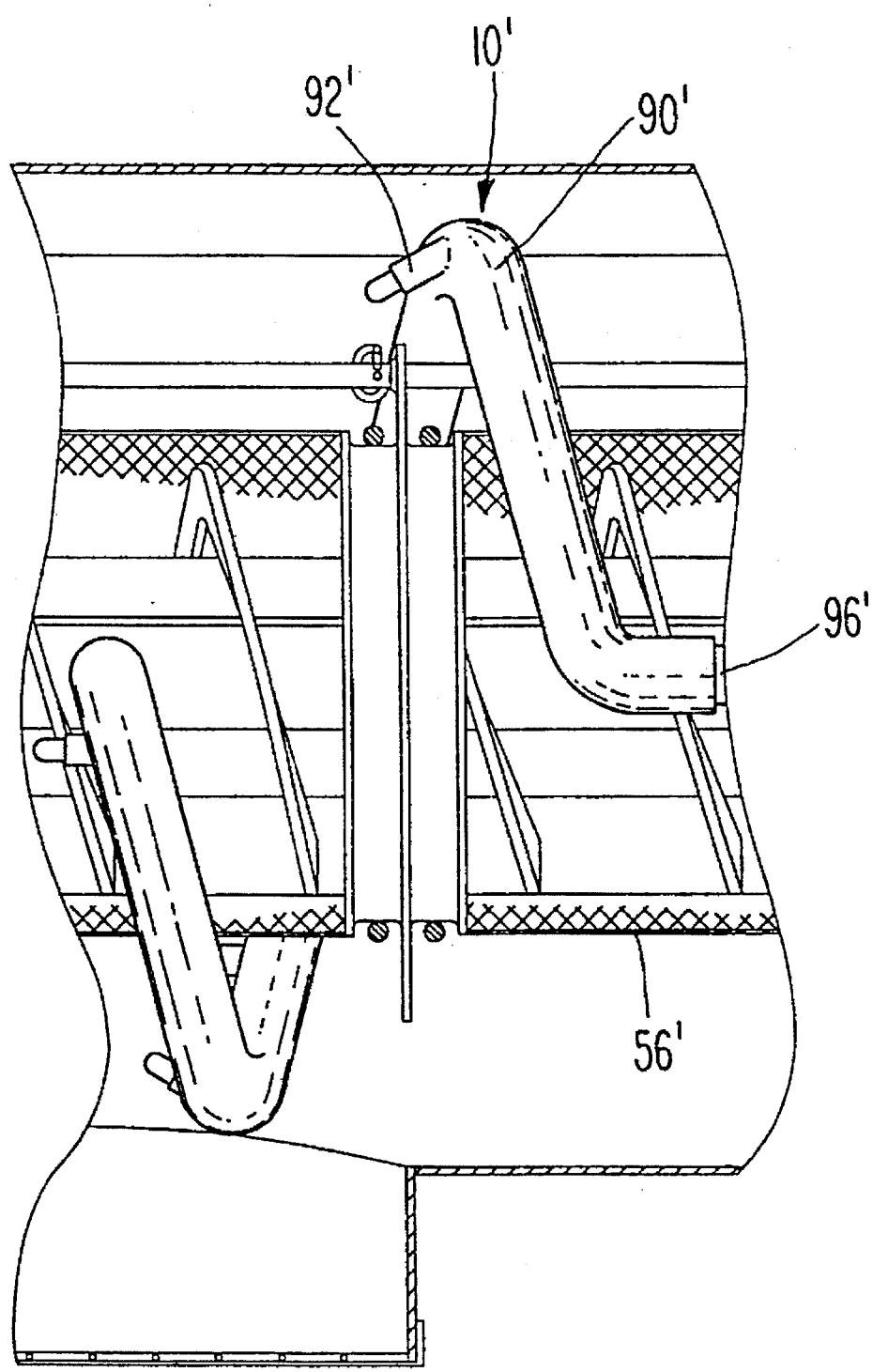
FIG. 6 is a cross-sectional view of a portion of the conveyor showing the alternative backwash apparatus.

An alternative embodiment of the backwash apparatus is shown in FIGS. 5 and 6. The backwash apparatus 10' has a manifold 90' which is a helix, as in contrast to the toroidal shape manifold of the first embodiment. As seen in FIG. 5, the manifold 90' is not a closed loop and has a seal end 124. The backwash apparatus 10' has a single header 96'. The casing for this alternative embodiment, not shown, would be similar to the one shown above, but would have only a single penetration enclosure.

While the helix manifold 90' does not create a closed loop, the manifold 90' encircles the mesh sleeve 56' such that the spray circumscribes the mesh sleeve 56'. In that the narrow band is displaced from the seal end 124 and the single header 96', the manifold 90' must travel further laterally to wash the entire mesh filter 18'.

The present invention may be embodied in other specific forms without departing from the spirit or central attributes thereof, and accordingly, reference should be made to the dependent claims, rather than to the foregoing specification, as indicating the scope of the invention.

I claim:

1. A centrifuge adapted for filtering a liquid from a liquid/solid mixture, the centrifuge comprising a conveyor having a hub and flights for imparting a centrifugal motion to the liquid/solid mixture;

a casing, the casing defining a tank for receiving the conveyor, the casing having support means for supporting the conveyor;

a drive means coupled to the conveyor for rotating the conveyor relative to the casing for creating rotation of the conveyor for imparting the centrifugal motion;

a filter contained within the tank and encircling the conveyor including the flights, the filter for filtering the liquid from the liquid/solid mixture; and a toroidal backwash system having a tube having a toroidally arranged series of angled nozzles positioned for spraying a fluid at the filter in a narrow band which circumscribes the filter, a drive means for moving the series of nozzles longitudinally along the filter for spraying the liquid against the filter in a narrow band distinct from the first narrow band by the relative movement of the nozzles to the filter.

2. A centrifuge as in claim 1 wherein the fluid from the backwash system is at a force to counteract the centrifugal force of the mixture over the narrow band of the filter engaged by the spray.

3. A centrifuge as in claim 1, the tubing containing the nozzles of the backwash system is a helix such that the helix encircles the filter.

4. A centrifuge as in claim 1, the fluid of the backwash system being the filtered liquid.

5. A centrifuge as in claim 1, wherein the tubing having the nozzles is connected to a header, the header projecting out of the casing through an opening, the fluid sprayed through the nozzles is pumped through the header to the tubing having the nozzles.

6. A centrifuge as in claim 5, wherein the drive means is a cylinder connected to the header for moving the header and the connected tube longitudinally such that the nozzles move relative to the filter.

7. In a centrifuge adapted for filtering a liquid from a liquid/solid mixture, the centrifuge having a conveyor having a hub and flights for imparting a centrifugal motion to the liquid/solid mixture;

a casing, the casing defining a tank for receiving the conveyor, the casing having support means for supporting the conveyor;

a drive means coupled to the conveyor for rotating the conveyor relative to the casing for creating rotation of the conveyor for imparting the centrifugal motion; and a filter contained within the tank and encircling the conveyor including the flights, the filter for filtering the liquid from the liquid/solid mixture; the improvement comprising a toroidal backwash system having a tube having a toroidally arranged series of angled nozzles positioned for spraying a fluid at the filter in a narrow band which circumscribes the filter, a drive means for moving the series of nozzles longitudinally along the filter for spraying the liquid against the filter in a narrow band distinct from the first narrow band by the relative movement of the nozzles to the filter.

8. In a centrifuge as in claim 7 wherein the fluid from the backwash system is at a force to counteract the centrifugal force of the mixture over the narrow band of the filter engaged by the spray.

9. In a centrifuge as in claim 7, the tubing having the nozzles of the backwash system is a helix such that the helix encircles the filter.

10. In a centrifuge as in claim 7, the fluid of the backwash system being the filtered liquid.

11. A method of cleaning a filter of a centrifuge comprising the following steps:

providing a conveyor having a hub and flights, and a filter encircling the conveyor;

spraying a backwash liquid at the filter by a toroidally arranged series of angled nozzles, and moving the series of nozzles longitudinally relative to the filter for cleaning a different portion of the filter.

12. A method of cleaning the filter as in claim 11 wherein the spraying of the filter by the nozzles is from the exterior of the filter.

13. A method of cleaning the filter as in claim 12 further comprising the steps of:

rotating the conveyor for filtering the liquid from the liquid/solid mixture through the filter while simultaneously spraying a backwash liquid at the filter from the exterior of the filter by a series of nozzles for backwashing a narrow band of the filter.

14. A method of filtering a liquid from a liquid/solid mixture, comprising the following steps:

inputting the liquid/solid mixture into a centrifuge;

rotating a conveyor of the centrifuge, the conveyor having a hub and flights;

imparting a centrifugal force on the liquid/solid mixture by the rotation of the conveyor;

filtering the liquid from the liquid/solid mixture through a filter encircling the conveyor;

spraying the filter in a direction opposite that of the filtered liquid in a narrow band circumscribing the filter using a toroidally arranged and angled series of nozzles;

continuing the filtering of the liquid from the liquid/solid mixture on those portions not being backwashed; and moving the nozzles relative to the filter for backwashing another portion of the filter while continuing to filter in other portions of the conveyor.

* * * * *